(12) United States Patent
Goenka

(10) Patent No.: US 9,038,400 B2
(45) Date of Patent: May 26, 2015

(54) TEMPERATURE CONTROL SYSTEM WITH THERMOELECTRIC DEVICE

(75) Inventor: Lakhi Nandlal Goenka, Ann Arbor, MI (US)

(73) Assignee: Gentherm Incorporated, Northville, MI (US)

( * ) Notice: Subject to any disclaimer, the term of this patent is extended or adjusted under 35 U.S.C. 154(b) by 1197 days.

(21) Appl. No.: 12/782,569

(22) Filed: May 18, 2010

(65) Prior Publication Data

US 2010/0287952 A1   Nov. 18, 2010

Related U.S. Application Data

(60) Provisional application No. 61/179,314, filed on May 18, 2009.

(51) Int. Cl.
*F25B 21/02* (2006.01)
*B60H 1/00* (2006.01)
(Continued)

(52) U.S. Cl.
CPC ........ *B60H 1/00478* (2013.01); *B60H 1/00885* (2013.01); *B60H 1/034* (2013.01); *F24F 5/0042* (2013.01)

(58) Field of Classification Search
CPC ............ B60H 1/034; B60H 1/02; B60H 1/03; B60H 1/22; B60H 1/2215
USPC .......... 62/3.61, 3.3, 3.2, 3.1, 3.6; 237/12.3 R, 237/12.4
See application file for complete search history.

(56) References Cited

U.S. PATENT DOCUMENTS

| 413,136 A | 10/1889 | Dewey |
| 2,363,168 A | 11/1944 | Findley |
| 2,499,901 A | 3/1950 | Brown, Jr. |

(Continued)

FOREIGN PATENT DOCUMENTS

| CN | 1195090 | 10/1998 |
| DE | 13 01 454 | 8/1969 |

(Continued)

OTHER PUBLICATIONS

Behr, "Thermal Management for Hybrid Vehicles," Power Point Presentation, Technical Press Day 2009, 20 pages.

(Continued)

*Primary Examiner* — Cheryl J Tyler
*Assistant Examiner* — Orlando E Aviles Bosques
(74) *Attorney, Agent, or Firm* — Knobbe, Martens, Olson & Bear, LLP

(57) ABSTRACT

Certain disclosed embodiments pertain to controlling temperature in a passenger compartment of a vehicle. For example, a temperature control system (TCS) can include an air channel configured to deliver airflow to the passenger compartment of the vehicle. The TCS can include a one thermal energy source and a heat transfer device connected to the air channel. A first fluid circuit can circulate coolant to the thermal energy source and a thermoelectric device (TED). A second fluid circuit can circulate coolant to the TED and the heat transfer device. A bypass circuit can connect the thermal energy source to the heat transfer device. An actuator can cause coolant to circulate selectively in either the bypass circuit or the first fluid circuit and the second fluid circuit. A control device can operate the actuator when it is determined that the thermal energy source is ready to provide heat to the airflow.

17 Claims, 8 Drawing Sheets

(51) Int. Cl.
*B60H 1/03* (2006.01)
*F24F 5/00* (2006.01)

(56) References Cited

U.S. PATENT DOCUMENTS

| | | | |
|---|---|---|---|
| 2,944,404 A | 7/1960 | Fritts | |
| 2,949,014 A | 8/1960 | Belton, Jr. et al. | |
| 2,984,077 A | 5/1961 | Gaskill | |
| 2,997,514 A | 8/1961 | Roeder, Jr. | |
| 3,085,405 A | 4/1963 | Frantti | |
| 3,125,860 A | 3/1964 | Reich | |
| 3,136,577 A | 6/1964 | Richard | |
| 3,137,142 A | 6/1964 | Venema | |
| 3,138,934 A | 6/1964 | Roane | |
| 3,196,620 A | 7/1965 | Elfving et al. | |
| 3,212,275 A | 10/1965 | Tillman, Jr. | |
| 3,213,630 A | 10/1965 | Mole | |
| 3,236,056 A | 2/1966 | Phillips et al. | |
| 3,252,504 A | 5/1966 | Newton | |
| 3,391,727 A | 7/1968 | Topouszian | |
| 3,527,621 A | 9/1970 | Newton | |
| 3,599,437 A | 8/1971 | Panas | |
| 3,635,037 A | 1/1972 | Hubert | |
| 3,681,929 A | 8/1972 | Schering | |
| 3,779,307 A | 12/1973 | Weiss et al. | |
| 3,817,043 A | 6/1974 | Zoleta | |
| 3,885,126 A | 5/1975 | Sugiyama et al. | |
| 4,038,831 A | 8/1977 | Gaudel et al. | |
| 4,051,691 A | 10/1977 | Dawkins | |
| 4,065,936 A | 1/1978 | Fenton et al. | |
| 4,193,271 A | 3/1980 | Honigsbaum | |
| 4,280,330 A | 7/1981 | Harris et al. | |
| 4,448,157 A | 5/1984 | Eckstein et al. | |
| 4,494,380 A | 1/1985 | Cross | |
| 4,531,379 A | 7/1985 | Diefenthaler, Jr. | |
| 4,658,599 A | 4/1987 | Kajiwara | |
| 4,665,707 A | 5/1987 | Hamilton | |
| 4,665,971 A | 5/1987 | Sakurai | |
| 4,707,995 A | 11/1987 | Assaf | |
| 4,753,682 A | 6/1988 | Cantoni | |
| 4,823,554 A | 4/1989 | Trachtenberg et al. | |
| 4,848,090 A | 7/1989 | Peters | |
| 4,858,069 A | 8/1989 | Hughes | |
| 4,905,475 A | 3/1990 | Tuomi | |
| 4,907,060 A | 3/1990 | Nelson et al. | |
| 4,922,721 A | 5/1990 | Robertson et al. | |
| 4,922,998 A | 5/1990 | Carr | |
| 4,947,735 A | 8/1990 | Guillemin | |
| 4,988,847 A | 1/1991 | Argos et al. | |
| 5,029,446 A | 7/1991 | Suzuki | |
| 5,038,569 A | 8/1991 | Shirota et al. | |
| 5,042,566 A | 8/1991 | Hildebrand | |
| 5,092,129 A | 3/1992 | Bayes et al. | |
| 5,097,829 A | 3/1992 | Quisenberry | |
| 5,111,664 A | 5/1992 | Yang | |
| 5,119,640 A | 6/1992 | Conrad | |
| 5,167,129 A | 12/1992 | Akasaka | |
| 5,193,347 A | 3/1993 | Apisdorf | |
| 5,198,930 A | 3/1993 | Muratomi | |
| 5,232,516 A | 8/1993 | Hed | |
| 5,269,146 A | 12/1993 | Kerner | |
| 5,291,960 A | 3/1994 | Brandenburg et al. | |
| 5,300,197 A | 4/1994 | Mitani et al. | |
| 5,303,771 A | 4/1994 | Des Champs | |
| 5,316,078 A | 5/1994 | Cesaroni | |
| 5,385,020 A | 1/1995 | Gwilliam et al. | |
| 5,386,823 A | 2/1995 | Chen | |
| 5,407,130 A | 4/1995 | Uyeki et al. | |
| 5,431,021 A | 7/1995 | Gwilliam et al. | |
| 5,448,891 A | 9/1995 | Nakagiri et al. | |
| 5,450,894 A | 9/1995 | Inoue et al. | |
| 5,483,807 A | 1/1996 | Abersfelder et al. | |
| 5,497,625 A | 3/1996 | Manz et al. | |
| 5,499,504 A | 3/1996 | Mill et al. | |
| 5,549,153 A | 8/1996 | Baruschke et al. | |
| 5,566,774 A | 10/1996 | Yoshida | |
| 5,576,512 A | 11/1996 | Doke | |
| 5,592,363 A | 1/1997 | Atarashi et al. | |
| 5,605,047 A | 2/1997 | Park et al. | |
| 5,653,111 A | 8/1997 | Attey et al. | |
| 5,673,964 A | 10/1997 | Roan et al. | |
| 5,694,770 A | 12/1997 | Bruck et al. | |
| 5,713,426 A | 2/1998 | Okamura | |
| 5,722,249 A | 3/1998 | Miller, Jr. | |
| 5,724,818 A | 3/1998 | Iwata et al. | |
| 5,725,048 A | 3/1998 | Burk et al. | |
| 5,802,856 A | 9/1998 | Schaper et al. | |
| 5,816,236 A | 10/1998 | Moroi et al. | |
| 5,890,371 A | 4/1999 | Rajasubramanian et al. | |
| 5,899,086 A | 5/1999 | Noda et al. | |
| 5,901,572 A | 5/1999 | Peiffer et al. | |
| RE36,242 E | 6/1999 | Apisdorf | |
| 5,918,930 A | 7/1999 | Kawai et al. | |
| 5,921,088 A | 7/1999 | Imaizumi et al. | |
| 5,955,772 A | 9/1999 | Shakouri et al. | |
| 5,964,092 A | 10/1999 | Tozuka et al. | |
| 5,966,941 A | 10/1999 | Ghoshal | |
| 5,975,856 A | 11/1999 | Welle | |
| 5,977,785 A | 11/1999 | Burward-Hoy | |
| 5,987,890 A | 11/1999 | Chiu et al. | |
| 6,050,326 A | 4/2000 | Evans | |
| 6,059,198 A | 5/2000 | Moroi et al. | |
| 6,082,445 A | 7/2000 | Dugan | |
| 6,084,172 A | 7/2000 | Kishi et al. | |
| 6,105,659 A | 8/2000 | Pocol et al. | |
| 6,119,463 A | 9/2000 | Bell | |
| 6,122,588 A | 9/2000 | Shehan et al. | |
| 6,138,749 A | 10/2000 | Kawai et al. | |
| 6,158,225 A | 12/2000 | Muto et al. | |
| 6,203,939 B1 | 3/2001 | Wilson | |
| 6,205,802 B1 | 3/2001 | Drucker et al. | |
| 6,205,805 B1 | 3/2001 | Takahashi et al. | |
| 6,213,198 B1 | 4/2001 | Shikata et al. | |
| 6,223,539 B1 | 5/2001 | Bell | |
| 6,270,015 B1 | 8/2001 | Hirota | |
| 6,282,907 B1 | 9/2001 | Ghoshal | |
| 6,293,107 B1 | 9/2001 | Kitagawa | |
| 6,324,860 B1 | 12/2001 | Maeda et al. | |
| 6,334,311 B1 | 1/2002 | Kim et al. | |
| 6,346,668 B1 | 2/2002 | McGrew | |
| 6,347,521 B1 | 2/2002 | Kadotani et al. | |
| 6,366,832 B2 | 4/2002 | Lomonaco et al. | |
| 6,393,842 B2 | 5/2002 | Kim | |
| 6,401,462 B1 | 6/2002 | Bielinski | |
| 6,412,287 B1 | 7/2002 | Hughes et al. | |
| 6,438,964 B1 | 8/2002 | Giblin | |
| 6,457,324 B2 | 10/2002 | Zeigler et al. | |
| 6,464,027 B1 | 10/2002 | Dage et al. | |
| 6,474,073 B1 | 11/2002 | Uetsuji et al. | |
| 6,474,081 B1 | 11/2002 | Feuerecker | |
| 6,481,213 B2 | 11/2002 | Carr et al. | |
| 6,510,696 B2 | 1/2003 | Guttman et al. | |
| 6,530,231 B1 | 3/2003 | Nagy et al. | |
| 6,530,920 B1 | 3/2003 | Whitcroft et al. | |
| 6,539,729 B2 | 4/2003 | Tupis et al. | |
| 6,554,088 B2 | 4/2003 | Severinsky et al. | |
| 6,560,968 B2 | 5/2003 | Ko | |
| 6,569,550 B2 | 5/2003 | Khelifa | |
| RE38,128 E | 6/2003 | Gallup et al. | |
| 6,598,403 B1 | 7/2003 | Ghoshal | |
| 6,605,773 B2 | 8/2003 | Kok | |
| 6,606,877 B2 | 8/2003 | Tomita et al. | |
| 6,607,142 B1 | 8/2003 | Boggs et al. | |
| 6,611,115 B2 | 8/2003 | Wakashiro et al. | |
| 6,640,889 B1 | 11/2003 | Harte et al. | |
| 6,653,002 B1 | 11/2003 | Parise | |
| 6,682,844 B2 | 1/2004 | Gene | |
| 6,705,089 B2 | 3/2004 | Chu et al. | |
| 6,722,139 B2 | 4/2004 | Moon et al. | |
| 6,732,534 B2 | 5/2004 | Spry | |
| 6,779,348 B2 | 8/2004 | Taban | |
| 6,792,259 B1 | 9/2004 | Parise | |
| 6,796,399 B2 | 9/2004 | Satou et al. | |
| 6,803,766 B2 | 10/2004 | Kobayashi et al. | |

(56) References Cited

U.S. PATENT DOCUMENTS

| | | | |
|---|---|---|---|
| 6,807,811 B2 | 10/2004 | Lee | |
| 6,810,977 B2 | 11/2004 | Suzuki | |
| 6,862,892 B1* | 3/2005 | Meyer et al. | 62/115 |
| 6,883,602 B2 | 4/2005 | Drucker | |
| 6,886,356 B2 | 5/2005 | Kubo et al. | |
| 6,894,369 B2 | 5/2005 | Irino et al. | |
| 6,896,047 B2 | 5/2005 | Currle et al. | |
| 6,907,739 B2 | 6/2005 | Bell | |
| 6,910,345 B2 | 6/2005 | Horstmann et al. | |
| 6,942,728 B2 | 9/2005 | Caillat et al. | |
| 6,959,555 B2 | 11/2005 | Bell | |
| 6,973,799 B2 | 12/2005 | Kuehl et al. | |
| 6,986,247 B1 | 1/2006 | Parise | |
| 7,007,491 B2 | 3/2006 | Grimm et al. | |
| 7,089,756 B2 | 8/2006 | Hu | |
| 7,100,369 B2 | 9/2006 | Yamaguchi et al. | |
| 7,134,288 B2 | 11/2006 | Crippen et al. | |
| 7,246,496 B2 | 7/2007 | Goenka et al. | |
| 7,310,953 B2 | 12/2007 | Pham et al. | |
| 7,363,766 B2 | 4/2008 | Eisenhour | |
| 7,380,586 B2 | 6/2008 | Gawthrop | |
| 7,426,835 B2 | 9/2008 | Bell | |
| 7,743,614 B2 | 6/2010 | Goenka et al. | |
| 7,788,933 B2 | 9/2010 | Goenka | |
| 7,926,293 B2 | 4/2011 | Bell | |
| 8,104,294 B2 | 1/2012 | Reeve | |
| 8,359,871 B2 | 1/2013 | Woods et al. | |
| 8,408,012 B2 | 4/2013 | Goenka et al. | |
| 8,490,412 B2 | 7/2013 | Bell et al. | |
| 8,495,884 B2 | 7/2013 | Bell et al. | |
| 8,613,200 B2 | 12/2013 | LaGrandeur et al. | |
| 8,783,397 B2 | 7/2014 | Goenka et al. | |
| 2001/0029974 A1 | 10/2001 | Cohen et al. | |
| 2002/0095943 A1* | 7/2002 | Hatakeyama et al. | 62/324.1 |
| 2003/0084935 A1 | 5/2003 | Bell | |
| 2003/0140636 A1 | 7/2003 | Van Winkle | |
| 2003/0145605 A1 | 8/2003 | Moon et al. | |
| 2003/0230443 A1 | 12/2003 | Cramer et al. | |
| 2004/0025516 A1 | 2/2004 | Van Winkle | |
| 2004/0050076 A1 | 3/2004 | Palfy et al. | |
| 2004/0093889 A1 | 5/2004 | Bureau et al. | |
| 2004/0098991 A1 | 5/2004 | Heyes | |
| 2004/0237541 A1 | 12/2004 | Murphy | |
| 2005/0000473 A1 | 1/2005 | Ap et al. | |
| 2005/0011199 A1 | 1/2005 | Grisham et al. | |
| 2005/0061497 A1 | 3/2005 | Amaral | |
| 2005/0067862 A1 | 3/2005 | Iqbal et al. | |
| 2005/0074646 A1 | 4/2005 | Rajashekara et al. | |
| 2005/0081834 A1 | 4/2005 | Perkins | |
| 2005/0139692 A1 | 6/2005 | Yamamoto | |
| 2005/0178128 A1 | 8/2005 | Harwood et al. | |
| 2005/0247336 A1 | 11/2005 | Inaoka | |
| 2005/0257531 A1 | 11/2005 | Kadle et al. | |
| 2005/0257545 A1 | 11/2005 | Ziehr et al. | |
| 2005/0268621 A1 | 12/2005 | Kadle et al. | |
| 2005/0278863 A1 | 12/2005 | Bahash et al. | |
| 2006/0005548 A1 | 1/2006 | Ruckstuhl | |
| 2006/0011152 A1 | 1/2006 | Hayes | |
| 2006/0059933 A1 | 3/2006 | Axakov et al. | |
| 2006/0075758 A1 | 4/2006 | Rice et al. | |
| 2006/0124165 A1 | 6/2006 | Bierschenk et al. | |
| 2006/0130490 A1 | 6/2006 | Petrovski | |
| 2006/0137358 A1 | 6/2006 | Feher | |
| 2006/0150657 A1 | 7/2006 | Spurgeon et al. | |
| 2006/0157102 A1 | 7/2006 | Nakajima et al. | |
| 2006/0188418 A1 | 8/2006 | Parks et al. | |
| 2006/0225441 A1 | 10/2006 | Goenka et al. | |
| 2006/0254284 A1 | 11/2006 | Ito et al. | |
| 2006/0254285 A1 | 11/2006 | Lin | |
| 2007/0000255 A1 | 1/2007 | Elliot et al. | |
| 2007/0017666 A1 | 1/2007 | Goenka et al. | |
| 2007/0056295 A1 | 3/2007 | De Vilbiss | |
| 2007/0193617 A1 | 8/2007 | Taguchi | |
| 2007/0214799 A1 | 9/2007 | Goenka | |
| 2007/0272290 A1 | 11/2007 | Sims et al. | |
| 2008/0017362 A1 | 1/2008 | Kwon et al. | |
| 2008/0028768 A1* | 2/2008 | Goenka | 62/3.2 |
| 2008/0230618 A1 | 9/2008 | Gawthrop | |
| 2008/0250794 A1 | 10/2008 | Bell | |
| 2008/0307796 A1 | 12/2008 | Bell et al. | |
| 2009/0000310 A1 | 1/2009 | Bell et al. | |
| 2009/0007572 A1 | 1/2009 | Bell et al. | |
| 2009/0118869 A1 | 5/2009 | Cauchy et al. | |
| 2010/0052374 A1 | 3/2010 | Bell | |
| 2010/0101238 A1 | 4/2010 | LaGrandeur et al. | |
| 2010/0101239 A1 | 4/2010 | LaGrandeur et al. | |
| 2010/0112419 A1 | 5/2010 | Jang et al. | |
| 2010/0155018 A1 | 6/2010 | Goenka et al. | |
| 2010/0291414 A1 | 11/2010 | Bell et al. | |
| 2010/0313576 A1 | 12/2010 | Goenka | |
| 2011/0067742 A1 | 3/2011 | Bell et al. | |
| 2011/0079023 A1 | 4/2011 | Goenka et al. | |
| 2011/0107773 A1 | 5/2011 | Gawthrop | |
| 2011/0236731 A1 | 9/2011 | Bell et al. | |
| 2012/0266608 A1 | 10/2012 | Kadle et al. | |
| 2013/0059190 A1 | 3/2013 | Kossakovski et al. | |
| 2013/0174579 A1 | 7/2013 | Goenka et al. | |
| 2013/0192271 A1 | 8/2013 | Ranalli et al. | |
| 2013/0192272 A1 | 8/2013 | Ranalli et al. | |
| 2013/0317728 A1 | 11/2013 | Hall et al. | |
| 2013/0327063 A1 | 12/2013 | Gawthrop | |
| 2014/0060086 A1 | 3/2014 | Ranalli | |

FOREIGN PATENT DOCUMENTS

| | | |
|---|---|---|
| DE | 2319155 | 10/1974 |
| DE | 197 30 678 | 1/1999 |
| DE | 198 29 440 | 1/2000 |
| DE | 199 51 224 | 5/2001 |
| DE | 20 105 487 | 10/2001 |
| DE | 10 2009 003 737 B4 | 10/2010 |
| EP | 0 389 407 | 9/1990 |
| EP | 0418995 B1 | 3/1991 |
| EP | 0 545 021 | 6/1993 |
| EP | 0 791 497 | 8/1997 |
| EP | 1641067 A1 | 3/2006 |
| EP | 1 932 695 A1 | 6/2008 |
| FR | 2806666 | 9/2001 |
| GB | 231 192 A | 5/1926 |
| GB | 1 040 485 | 8/1966 |
| GB | 2 267 338 | 12/1993 |
| GB | 2 333 352 | 7/1999 |
| JP | 56-18231 | 2/1981 |
| JP | 01 131830 A | 5/1989 |
| JP | 01 200122 | 8/1989 |
| JP | 01 281344 | 11/1989 |
| JP | 04 103925 | 4/1992 |
| JP | 4-165234 | 6/1992 |
| JP | 05-037521 U | 5/1993 |
| JP | 6-024235 | 2/1994 |
| JP | 06-135218 | 5/1994 |
| JP | 07-089334 | 4/1995 |
| JP | 07-54189 | 6/1995 |
| JP | 07-253224 | 10/1995 |
| JP | 08-316388 | 11/1996 |
| JP | 09042801 | 2/1997 |
| JP | 09-254630 | 9/1997 |
| JP | 9-276076 | 10/1997 |
| JP | 10035268 | 2/1998 |
| JP | 11-042933 | 2/1999 |
| JP | 11-301254 | 11/1999 |
| JP | 11-342731 | 12/1999 |
| JP | 2000 130883 A1 | 5/2000 |
| JP | 2000-161721 | 6/2000 |
| JP | 2000-274788 | 6/2000 |
| JP | 2000-274871 A | 10/2000 |
| JP | 2000-274874 | 10/2000 |
| JP | 2000-318434 | 11/2000 |
| JP | 2002-13758 | 1/2002 |
| JP | 2002059736 A | 2/2002 |
| JP | 2003-237357 | 8/2003 |
| JP | 2004 0508745 | 2/2004 |
| JP | 2005 212564 | 8/2005 |
| JP | 2005-302851 | 10/2005 |

(56) References Cited

FOREIGN PATENT DOCUMENTS

| | | |
|---|---|---|
| JP | 2006 015965 | 1/2006 |
| JP | 2007-161110 | 6/2007 |
| JP | 2008-094366 | 4/2008 |
| KR | 2001 111646 | 12/2001 |
| KR | 10-2002-0057600 | 6/2007 |
| KR | 10-2011-0013876 | 2/2011 |
| LU | 66619 | 2/1973 |
| SE | 337 227 | 5/1971 |
| SU | 184886 A | 7/1966 |
| WO | WO 95/01500 | 1/1995 |
| WO | WO 96/05475 | 2/1996 |
| WO | WO 97/47930 | 12/1997 |
| WO | WO 99/09360 A1 | 2/1999 |
| WO | WO 99/10191 | 3/1999 |
| WO | WO 99/58907 | 11/1999 |
| WO | WO 02/00458 | 1/2002 |
| WO | WO 03/014634 | 2/2003 |
| WO | WO 2005/023571 | 3/2005 |
| WO | WO 2008/147305 A1 | 4/2005 |
| WO | WO 2005/063567 | 7/2005 |
| WO | WO 2006/037178 A | 4/2006 |
| WO | WO 2006/064432 | 6/2006 |
| WO | WO 2007/001289 | 1/2007 |
| WO | WO 2007/021273 A1 | 2/2007 |
| WO | WO-2007021273 * 2/2007 | ............. F25B 21/02 |
| WO | WO 2008/123663 | 10/2008 |
| WO | WO 2008/148042 | 12/2008 |
| WO | WO 2010/048575 | 4/2010 |

OTHER PUBLICATIONS

Heckenberger, Thomas, "Li-on Battery Cooling," BEHR Power Point Presentation, Technical Press Day, Stuttgart, May 20, 2009, 13 pages.

Jeon et al., "Development of Battery Pack Design for High Power Li-Ion Battery Pack of HEV", The World Electric Vehicle Association Journal, 2007, vol. 1, pp. 94-99.

Sabbah et al., "Passive Thermal Management System for Plug-in Hybrid and Comparison with Active Cooling: Limitation of Temperature Rise and Uniformity of Temperature Distribution", ECS Transactions, 2008, vol. 13, Issue 19, pp. 41-52.

Lofy, John et al., "Thermoelectrics for Environmental Control Automobiles," 21st International Conference on Thermoelectronics, 2002, p. 471-476.

International Search Report and Written Opinion dated Nov. 15, 2011, International Application No. PCT/US2010/035313.

* cited by examiner

TEMPERATURE CONTROL SYSTEM WITH THERMOELECTRIC DEVICE

CROSS-REFERENCE TO RELATED APPLICATION

This application claims the benefit under 35 U.S.C. §119 (e) of U.S. Provisional Patent Application No. U.S. 61/179,314, titled TEMPERATURE CONTROL SYSTEM USING THERMOELECTRIC DEVICE AND SHARED HEAT EXCHANGER, filed May 18, 2009, the entire contents of which are incorporated by reference herein and made a part of this specification.

BACKGROUND

1. Field

The present invention generally relates to climate control, and more specifically to temperature control in vehicles.

2. Description of Related Art

A passenger compartment of a vehicle is typically heated and cooled by a heating, ventilating, and air conditioning (HVAC) system. The HVAC system directs a flow of air through a heat exchanger to heat or cool the air prior to flowing into the passenger compartment. Energy for heating and cooling of the passenger compartment of the vehicle can be supplied from a fuel fed engine such as an internal combustion engine, for example. In the heat exchanger, energy is transferred between the air and a coolant such as a water-glycol coolant, for example. The air can be supplied from ambient air or a mixture of air re-circulated from the passenger compartment and ambient air.

SUMMARY

Embodiments described herein have several features, no single one of which is solely responsible for their desirable attributes. Without limiting the scope of the invention as expressed by the claims, some of the advantageous features will now be discussed briefly.

Certain disclosed embodiments pertain to controlling temperature in a passenger compartment of a vehicle. For example, a temperature control system (TCS) can include an air channel configured to deliver airflow to the passenger compartment of the vehicle. The TCS can include a one thermal energy source and a heat transfer device connected to the air channel. A first fluid circuit can circulate coolant to the thermal energy source and a thermoelectric device (TED). A second fluid circuit can circulate coolant to the TED and the heat transfer device. A bypass circuit can connect the thermal energy source to the heat transfer device, bypassing the TED. An actuator can cause coolant to circulate selectively in either the bypass circuit or the first fluid circuit and the second fluid circuit. A control device can operate the actuator when it is determined that the thermal energy source is ready to provide heat to the airflow.

Some embodiments provide a system for controlling temperature in a passenger compartment of a vehicle, the system including at least one passenger air channel configured to deliver a passenger airflow to the passenger compartment of the vehicle, at least one thermal energy source, at least one heat transfer device connected to the passenger air channel, at least one thermoelectric device (TED), a first fluid circuit configured to circulate coolant to the thermal energy source and the TED, a second fluid circuit separate from the first fluid circuit, the second fluid circuit configured to circulate coolant to the TED and the heat transfer device, at least one bypass circuit configured to connect the thermal energy source to the heat transfer device, at least one actuator configured to cause coolant to circulate in the bypass circuit instead of the first fluid circuit and the second fluid circuit, and at least one control system. The control system may be configured to operate the at least one actuator when it is determined that the thermal energy source is ready to provide heat to the passenger airflow, thereby causing coolant to circulate in the bypass circuit instead of in the first fluid circuit and the second fluid circuit.

Additional embodiments may include a pump configured to circulate coolant in the second fluid circuit. The system may also include an evaporator operatively connected to the passenger air channel. The thermal energy source may be a vehicle engine, a heater core supplied with thermal energy from a vehicle engine, an exhaust system, another suitable heat source, or a combination of sources. Another embodiment may include a blend door operatively connected in the passenger air channel and configured to route the passenger airflow across the heat transfer device. In some embodiments the actuator may be a fluid control device, a valve, a regulator, or a combination of structures.

Further embodiments may include a third fluid circuit configured to connect the TED to a low temperature core. The low temperature core may be a radiator configured to dissipate heat from a fluid to ambient air. The third fluid circuit may also include a pump to provide adequate movement of fluid. The control system may also be further configured to determine whether the system is operating in a heating mode or a cooling mode; and operate at least one actuator to cause coolant to circulate in the third fluid circuit when it is determined that the system is operating in the cooling mode.

In some embodiments the thermal energy source is ready to provide heat to the passenger airflow when the thermal energy source reaches a threshold temperature. The controller may also determine the thermal energy source is ready to provide heat to the passenger airflow when the coolant circulating through the thermal energy source reaches a threshold temperature.

Some embodiments provide a method of controlling temperature in a passenger compartment of a vehicle, the method including moving a passenger airflow across a heat transfer device operatively connected within a passenger air channel of the vehicle; operating a temperature control system of the vehicle in a first mode of operation, in which a thermoelectric device (TED) transfers thermal energy between a first fluid circuit including the heat transfer device and a second fluid circuit including a thermal energy source; and switching the temperature control system to a second mode of operation after the temperature control system has been operated in the first mode of operation. In the second mode of operation, the temperature control system opens a bypass circuit in thermal communication with the heat transfer device and the thermal energy source. The bypass circuit is configured to transfer thermal energy between the heat transfer device and the thermal energy source without the use of the TED.

In other embodiments the temperature control system switches to a second mode when the thermal energy source has reached a threshold temperature. The thermal energy source may be an automobile engine. The temperature control system may switch to a second mode based on other criterion, such as, when the temperature of the fluid within the second fluid circuit reaches a threshold temperature, when a specified amount of time has elapsed, when the temperature of the passenger airflow reaches a threshold temperature, or any other specified condition or combination of conditions.

Certain embodiments provide a method of manufacturing an apparatus for controlling temperature in a passenger compartment of a vehicle, the method including providing at least one passenger air channel configured to deliver a passenger airflow to the passenger compartment of the vehicle, operatively connecting at least one heat transfer device to the passenger air channel, providing at least one thermal energy source, providing at least one thermoelectric device (TED), operatively connecting a first fluid circuit to the thermal energy source and the TED, wherein the first fluid circuit is configured to circulate coolant, operatively connecting a second fluid circuit to the TED and the heat transfer device, wherein the second fluid circuit is configured to circulate coolant, operatively connecting at least one bypass circuit to the thermal energy source to the heat transfer device, wherein the at least one bypass circuit is configured to circulate coolant, providing at least one actuator configured to cause coolant to circulate in the bypass circuit instead of the first fluid circuit and the second fluid circuit, and providing at least one control device configured to operate the at least one actuator when it is determined that the thermal energy source is ready to provide heat to the passenger airflow.

In some embodiments the passenger air channel may include a first air channel and a second air channel. The second air channel can be at least partially in a parallel arrangement with respect to the first air channel. The passenger air channel may also include a blend door configured to selectively divert airflow through the first air channel and the second air channel. The heat transfer device may be disposed in only the second air channel.

In other embodiments an evaporator may be operatively connected to the passenger air channel. Some embodiments may also include a low temperature core. A third fluid circuit may be operatively connected to the low temperature core and the TED. The third fluid circuit can be configured to circulate coolant.

BRIEF DESCRIPTION OF THE DRAWINGS

The following drawings and the associated descriptions are provided to illustrate embodiments of the present disclosure and do not limit the scope of the claims.

DETAILED DESCRIPTION OF PREFERRED EMBODIMENTS

Figure 1:
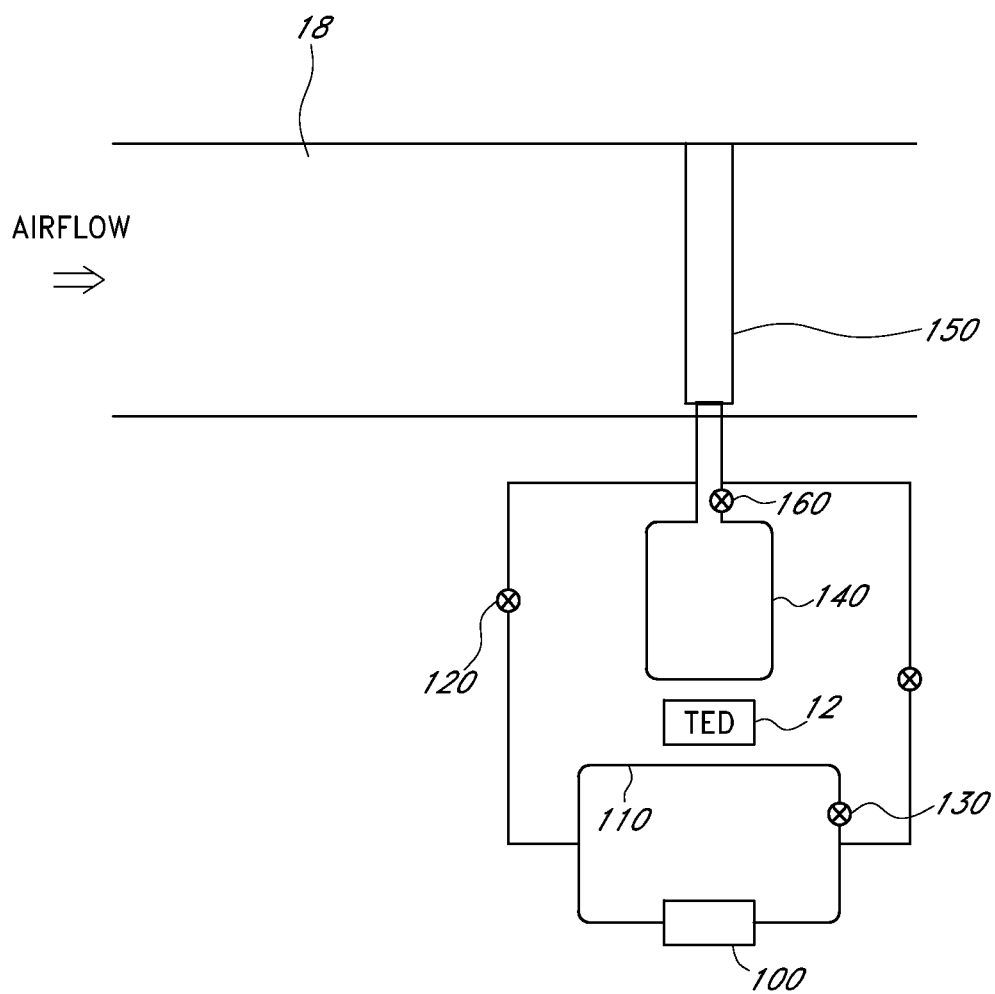
FIG. 1 is a schematic illustration of an embodiment of a temperature control system.

Although certain preferred embodiments and examples are disclosed herein, inventive subject matter extends beyond the specifically disclosed embodiments to other alternative embodiments and/or uses of the inventions, and to modifications and equivalents thereof. Thus, the scope of the inventions herein disclosed is not limited by any of the particular embodiments described below. For example, in any method or process disclosed herein, the acts or operations of the method or process may be performed in any suitable sequence and are not necessarily limited to any particular disclosed sequence.

For purposes of contrasting various embodiments with the prior art, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. While some of the embodiments are discussed in the context of particular temperature control and/or fluid circuit configurations, it is understood that the inventions may be used with other system configurations. Further, the inventions are limited to use with vehicles, but may be advantageously used in other environments where temperature control is desired.

The temperature of a vehicle passenger compartment is typically controlled using a heating, ventilating, and air conditioning (HVAC) system. When the system is used for heating, the vehicle engine can provide thermal energy to passenger compartment airflow via a fluid circuit. A heat exchanger (such as, for example, a heater core) disposed in the airflow can be configured to transfer thermal energy to the airflow that crosses the heat exchanger before entering the passenger compartment. In such configurations, the engine or heater core of a vehicle can take a substantial amount of time after the engine is started, such as several minutes, to reach a temperature at which the heater core is able to sufficiently heat air directed into the vehicle passenger compartment such that the temperature of the air is comfortable to vehicle occupants. When the heater core has reached a temperature at which it can transfer sufficient thermal energy to the passenger compartment airflow for it to be comfortable, it can be said that the heater core and/or engine is "ready" to heat the airflow.

Cooling can be achieved using a compressor-based refrigeration system (including various components, such as an evaporator) to cool the airflow entering the passenger compartment. The vehicle engine can provide energy to power the components of a cooling system (e.g., via a mechanical or electrical linkage). Many components of a cooling system are often separate from the components of a heating system. For example, a cooling system typically is connected to the passenger compartment airflow using a heat exchanger separate from the heater core.

Automotive HVAC architectures can include one or more thermoelectric devices (TED) that supplement or replace one or more portions of a heating and cooling system for the passenger compartment. By supplying electrical energy to a thermoelectric device, thermal energy can be transferred to or from passenger airflow via one or more fluid circuits and/or heat exchangers. As a stand alone heater, a thermoelectric device can remain energized even after the compartment and engine have reached a desired temperature. In a system using such a configuration, the energy applied to the thermoelectric device once the vehicle engine reaches a temperature sufficient to heat the passenger compartment may be wasted because waste heat from the engine may be sufficient to heat the passenger compartment.

In some embodiments, TEDs can be configured to supplement the heating and cooling of a passenger compartment. In an example configuration, an engine and a thermoelectric device can transfer heat to one or more heat exchangers that connect to passenger airflow. However, adding thermoelectric devices to a heating and cooling system typically has a large impact on the HVAC system design, and designs can include two or more heat exchangers. Therefore, a need exists for an improved temperature control system that is able to heat and/or cool a passenger compartment quickly and efficiently without requiring additional heat exchangers or large numbers of other components not used in a typical HVAC system design. A system would be advantageous if it could selectively provide heating from an engine and/or thermoelectric device, while also being able to provide cooling from the thermoelectric device, through a common heat exchanger connected to passenger airflow.

Some automotive HVAC systems provide a demisting function, in which humidity is removed from air during a heating mode to remove fogging and/or prevent condensate formation on a windscreen. In some systems, the demisting function is achieved by forcing air first through an evaporator to lower the air temperature below the dew point, thus condensing and removing moisture. The evaporator can, for example, be cooled by a two-phase vapor compression cycle. After passing through the evaporator, the air can be forced through a heater to achieve a suitable temperature for passenger comfort.

As used herein, the terms "sufficient" and "sufficiently," are used broadly in accordance with their ordinary meanings. For example, in the context of heating or heat transfer, these terms broadly encompass, without limitation, a condition in which a passenger airflow is heated to a temperature that is comfortable to a passenger (e.g., when the airflow is forced into the passenger compartment via one or more vents) or a condition in which the passenger airflow is heated to a threshold temperature.

As used herein, the term "ready," is also used broadly in accordance with its ordinary meaning. For example, in the context of a heat source, the term broadly encompasses, without limitation, a condition in which one or more criteria for determining when the heat source can sufficiently heat the passenger airflow are met. For example, a heat source can sufficiently heat the passenger airflow when a heater core can transfer enough thermal energy to the airflow for it to be comfortable when directed at or in the vicinity of a vehicle occupant. The airflow may be comfortable when it is about room temperature, equal to or somewhat higher than room temperature, greater than room temperature, or greater than or equal to a suitable threshold temperature. A suitable threshold temperature can be about 70° F., about 72° F., about 75° F., room temperature, a temperature that depends on the ambient temperature, or another temperature.

As used herein, the term "coolant" is used broadly in accordance with its ordinary meaning. For example, the term broadly encompasses fluids that transfer thermal energy within a heating or cooling system.

As used herein, the term "heat transfer device" is used broadly in accordance with its ordinary meaning. For example, the term broadly encompasses a heat exchanger, a heat transfer surface, a heat transfer structure, another suitable apparatus for transferring thermal energy between media, or any combination of such devices.

As used herein, the terms "thermal energy source" and "heat source" are used broadly in accordance with their ordinary meanings. For example, the terms broadly encompass a vehicle engine, an exhaust system, a heating element, any suitable device that converts energy into thermal energy, or a combination of devices.

As used herein, the term "passenger air channel" is broadly used in its ordinary sense. For example, a passenger air channel encompasses components through which air can flow, including ducts, pipes, vents, ports, connectors, an HVAC system, other suitable structures or combination of structures.

As used herein, the term "thermoelectric device" is used broadly in accordance with its ordinary meaning. For example, the term broadly encompasses any device that incorporates thermoelectric material and is used to transfer thermal energy or to produce an electrical output based on a temperature differential. A thermoelectric device may be integrated or used in conjunction with other temperature control elements, such as a heater core, an evaporator, an electrical heating element, a thermal storage device, a heat exchanger, another structure, or a combination of structures.

As used herein, the term "actuator" is used broadly in accordance with its ordinary meaning. For example, the term broadly encompasses fluid control devices, such as valves, regulators, and other suitable structures or combination of structures used to the control the flow of fluids.

As used herein, the term "control device" is used broadly in accordance with its ordinary meaning. For example, the term broadly encompasses a device or system that is configured to control fluid movement, electrical energy transfer, thermal energy transfer, and/or data communications among one or more. The control device may include a single controller that controls one or more components of the system, or it may include more than one controller controlling various components of the system.

Referring now to FIG. 1, illustrated is an embodiment of a temperature control system including an engine 100, a thermoelectric device (TED) 12, a heat transfer device 150, and a passenger air channel 18. The heat transfer device 150 is disposed in the air passenger channel 18. The passenger air channel 18 is configured such than an airflow may pass through the channel 18 and be in thermal communication with the heat transfer device 150. In some embodiments, an air handling unit (e.g., a fan) is configured to convey the airflow. At least some of the components of the system can be in fluid communication via thermal energy transport means such as fluid conducting tubes, for example. Actuators, such as valves 120, 130 and 160 can be used to control the thermal energy transfer through the tubing. A control device, such as a controller can be configured to control the various components of the system and their relative fluid communication.

In the illustrated embodiment, in a first mode, when valve 130 is open and valve 160 is open, there is thermal communication between the heat transfer device 150, the TED 12, and the engine 100. In a first circuit, or thermal source circuit, 110, a fluid, such as coolant, is circulated and thermal energy is transferred between the engine 100 and the TED 12. The TED 12 is provided with electrical energy of a specific polarity that allows it to transfer thermal energy between the first circuit 110 and a second circuit, or heat transfer circuit, 140. Fluid is circulated in the second circuit 140 and thermal energy is transferred between the heat transfer device 150 and the TED 12. In the first mode, the TED pumps thermal energy from the first circuit 110 to the second circuit 140, where it is transferred to the airflow via the heat transfer device 150.

In a second mode, a bypass circuit actuator 120 is open, and other actuators 130, 160 are closed, allowing fluid to circulate in a bypass circuit. The circulating fluid permits thermal communication between the engine 100 and the heat transfer device 150. The TED 12 is bypassed and is no longer in thermal communication with the engine 100 or the heat transfer device 150. In this mode of operation, fluid flow is stopped in the first circuit 110 and the second circuit 140, and electrical energy is not supplied to the TED. In some embodiments, the system can switch between the first mode and the second mode of operation. In some embodiments, a low temperature core (not shown) can be operatively connected or selectively operatively connected to the first fluid circuit 110 and used to transfer thermal energy to ambient air from the heat transfer device 150, the TED 12, or other elements of the temperature control system. For example, the low temperature core could be connected parallel to or in place of the engine 100 in at least some modes of operation.

The TED 12 can include one or more thermoelectric elements that transfer thermal energy in a particular direction when electrical energy is applied. When electrical energy is applied using a first polarity, the TED 12 transfers thermal energy in a first direction. Alternatively, when electrical energy is applied using a second polarity opposite the first polarity, the TED 12 transfers thermal energy in a second direction opposite the first direction. The TED 12 can be configured to transfer thermal energy to the heat transfer device 150 when electrical energy of a first polarity is applied by configuring the system such that the heating end of the TED 12 is in thermal communication with the heat transfer device 150. Further, the cooling end of the TED 12 can be place in thermal communication with the engine 100 so that the TED 12 draws thermal energy from the circuit to which the engine is connected. In certain embodiments, a control system (not shown) regulates the polarity of electrical energy applied to the TED 12 to select between a heating mode and a cooling mode. In some embodiments, the control system regulates the magnitude of electrical energy applied to the TED 12 to select a heating or cooling capacity.

Figure 2:
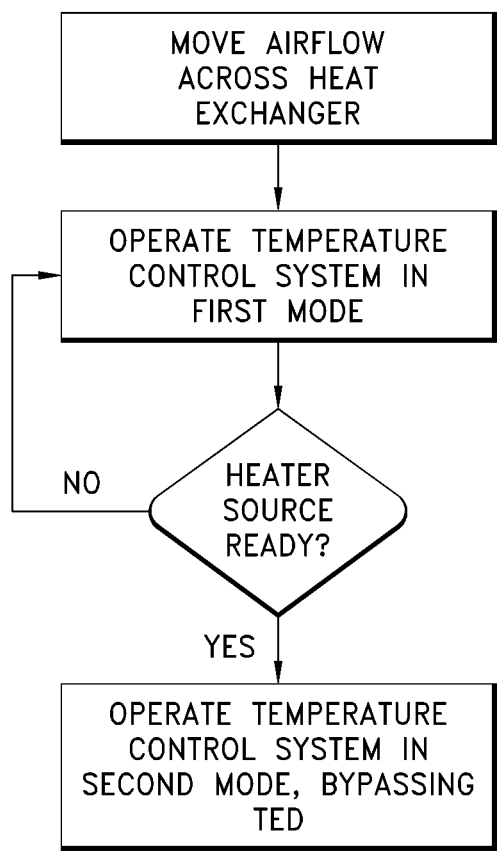
FIG. 2 is a flowchart related to an embodiment of a temperature control system with a bypassable TED.

FIG. 2 illustrates a method of controlling temperature in a passenger compartment of a vehicle. The method includes moving airflow across a heat exchanger. The airflow can travel through one or more passenger air channels, such as ducts, before entering the passenger compartment. Initially, the control system operates in a first mode, in which a TED pumps thermal energy from a heat source to a circuit connected to the heat exchanger or directly to the heat exchanger. The control system continues to operate in the first mode until one or more switching criteria are met. When the one or more criteria are met the control system switches to a second mode of operation. In one embodiment, the control system switches to the second mode when coolant circulating through an engine or another heat source is ready to heat the airflow. In the second mode thermal energy is transferred from the engine or other heat source to the heat exchanger. The TED is bypassed and is not in substantial thermal communication with the heat source or the heat exchanger. In this configuration, a fluid, such as coolant, flows through a bypass circuit so that thermal energy transfer occurs in the bypass circuit. The system can also operate one or more actuators, such as valves, in order to cause the fluid flow to bypass the TED. In one embodiment, a controller controls valves to switch between modes of operation. In the second mode of operation, the heat exchanger can act much the same as a heater core in a conventional vehicle HVAC system.

The one or more criteria for switching modes of operation can be any suitable criteria and are not limited to characteristics of the vehicle or temperature parameters. In some embodiments, the criteria for switching the fluid flow include one or more of the following: algorithms, user action or inaction, the temperature of a thermal energy source, fluid temperature, an amount of time elapsed, and air temperature.

In certain embodiments, the criteria can also be user-specified or user-adjusted according to preference. In one embodiment, switching from a first mode to a second mode occurs when the engine reaches a threshold temperature. In another embodiment, the switch occurs when a fluid circuit reaches a threshold temperature. In yet another embodiment, the switch occurs when the air temperature reaches a threshold temperature.

Figure 3:
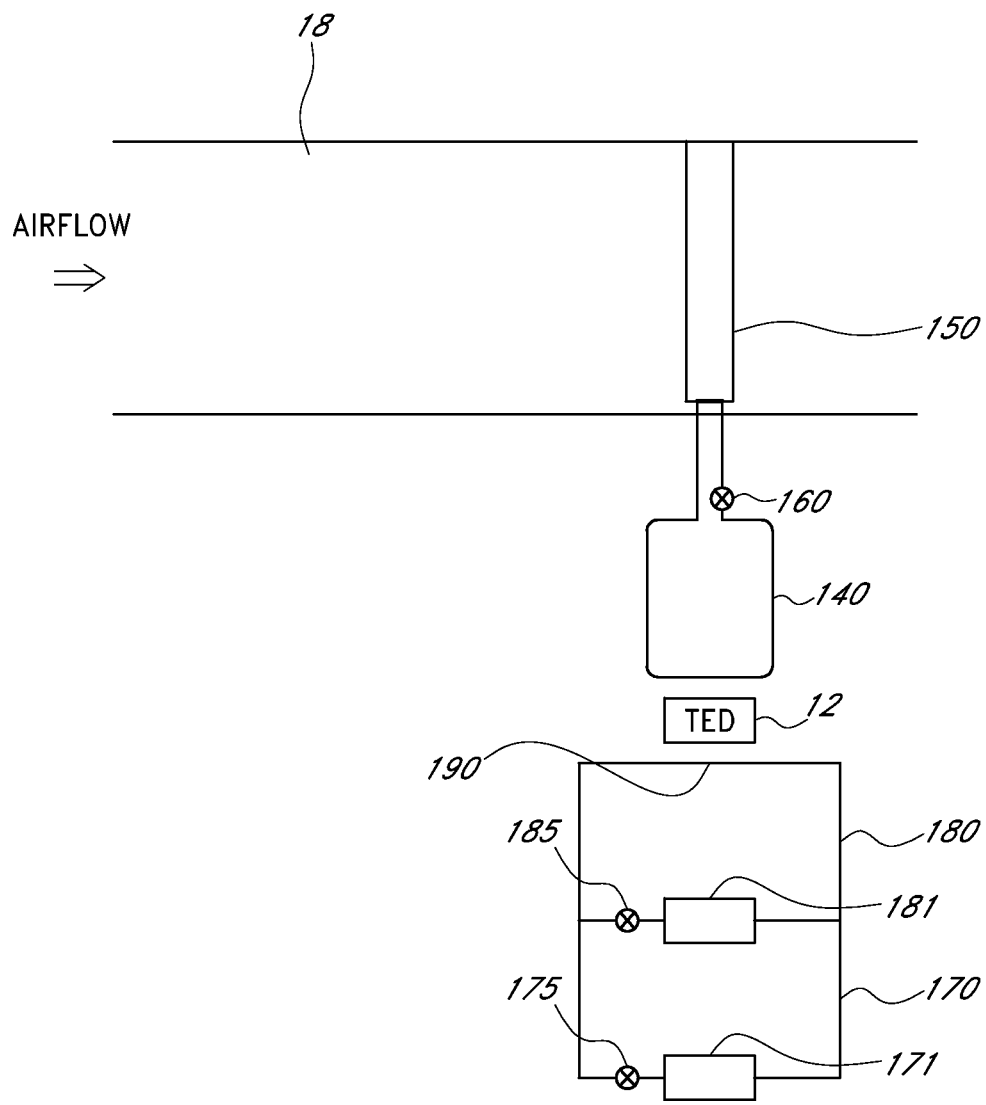
FIG. 3 is a schematic illustration of an embodiment of a temperature control system including a cooling circuit and a heating circuit.

Referring to FIG. 3, an embodiment of a temperature control system is illustrated which can be configured to heat and cool an airflow in a passenger air channel 18. The system comprises a TED 12, a heat transfer device 150, a low temperature core, or heat sink, 171, a thermal energy source 181, and a plurality of actuators 160, 175, 185. The heat transfer device 150 is disposed in the air passenger channel 18. The passenger air channel 18 is configured such than an airflow may pass through the channel 18 and be in thermal communication with the heat transfer device 150. In some embodiments, an air handling unit (e.g., a fan) is configured to convey the airflow. The system further comprises a heat sink circuit 170 which includes the low temperature core 171 and at least one valve 175. The TED 12 is in thermal communication with the heat sink circuit 170 at the thermal junction 190. The system also comprises a heat source circuit 180 which includes the thermal energy source 181 and at least one valve 185. The TED 12 is in thermal communication with the heat source circuit 180 at a thermal junction 190. Some embodiments also comprise a heat transfer circuit including the heat transfer device 150 and at least one valve 160. The heat transfer circuit 140 is in thermal communication with the TED 12 and heat is transferred between the airflow and the heat transfer device 150. In one embodiment, the thermal energy source 181 is an automobile engine and the low temperature core is a radiator. It is also contemplated that pumps can be configured to function with the system in order to cause fluid flow.

The system may be configured for operation in different modes by operating at least one of the valves 175 and 185, which causes coolant to flow through the heat source circuit or the heat sink circuit depending on whether a heating or cooling mode is selected. In a heating mode, opening valve 185 and closing valve 175 causes coolant to flow through the heat source circuit 180 and not through the heat sink circuit 170. In this mode, the TED 12 operates in a first polarity and is configured to transfer thermal energy from the heat source circuit 180 to the heat transfer circuit 140, which, in turn, transfers thermal energy to the airflow in the passenger air channel 18.

In a cooling mode, the closing valve 185 and the opening valve 175 cause coolant to flow through the heat sink circuit 170 and not through the heat source circuit 180. In this mode, the TED 12 operates in a second polarity, which is opposite the first polarity, and is configured to transfer thermal energy from the heat transfer circuit 140 to the heat sink circuit 170, which lowers the temperature of the airflow by transferring thermal energy from the airflow to the heat sink circuit 170.

Figure 4:
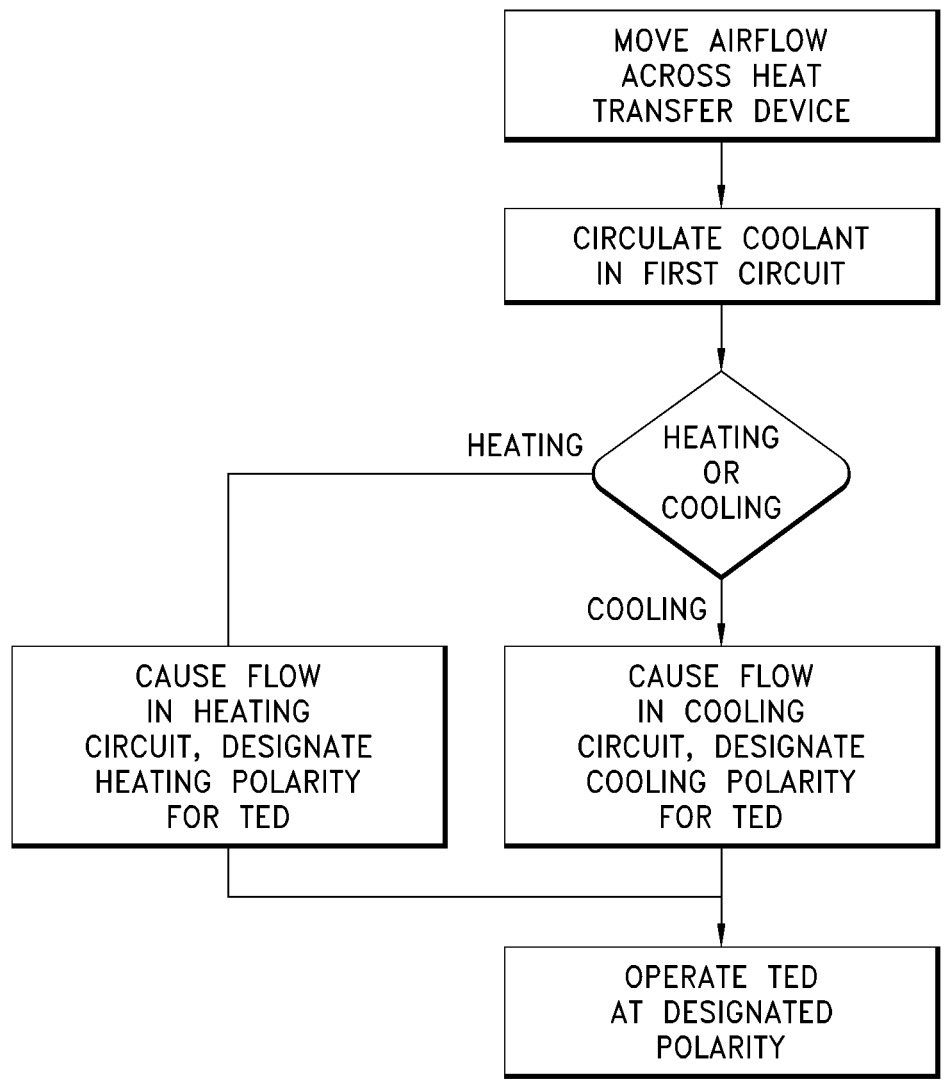
FIG. 4 is a flowchart related to the embodiment of a temperature control system illustrated in FIG. 3.

FIG. 4 illustrates another embodiment of a method of operation for a temperature control system, in which the embodiment of the system illustrated in FIG. 3 could follow. In this embodiment, an airflow moves across a heat transfer device and into a passenger compartment. In certain embodiments, the system circulates a fluid, such as coolant in a first circuit, or heat transfer circuit, which is in thermal communication with the heat transfer device and a thermoelectric device (TED). The system receives an indication as to whether a heating mode or a cooling mode is selected. If the heating mode is selected, then the system causes fluid to flow in a heat source circuit which is in thermal communication with a thermal energy source and the TED at a thermal junction. In the heating mode, the TED transfers thermal energy between the heat source circuit and the heat transfer circuit. If the cooling mode is selected, then the system causes fluid to flow in the heat sink circuit which is in thermal communication with a low temperature core and the TED at the thermal junction. In the cooling mode, the TED transfers thermal energy between the heat sink circuit and the heat transfer circuit. The system designates a selected polarity based on whether the heating mode or cooling mode is selected and electrical energy of the selected polarity is provided to the TED. In the heating mode, a polarity is selected that causes the TED to transfer thermal energy from the heat source circuit to the heat transfer device. In the cooling mode, a polarity is selected that causes the TED to transfer thermal energy from the heat transfer device to the heat sink circuit.

As discussed in relation to the embodiment of the system illustrated in FIG. 3, the heat sink circuit and the heat source circuit can include actuators which can be used to control the flow of fluid or coolant within the system. In one embodiment, the system causes fluid to flow through the heat sink circuit by operating an actuator associated with the heat source circuit. In another embodiment, the system can cause fluid to flow through the heat sink circuit by operating an actuator associated with the heat sink circuit. Further, in some embodiments, an actuator associated with the heat sink circuit can be opened and an actuator associated with the heat source circuit can be closed in order to cause fluid to flow in the heat sink circuit. It is also contemplated that a plurality of pumps can be configured to function with the heat transfer circuit, heat sink circuit and the heat source circuit in order to facilitate fluid flow.

Figure 5:
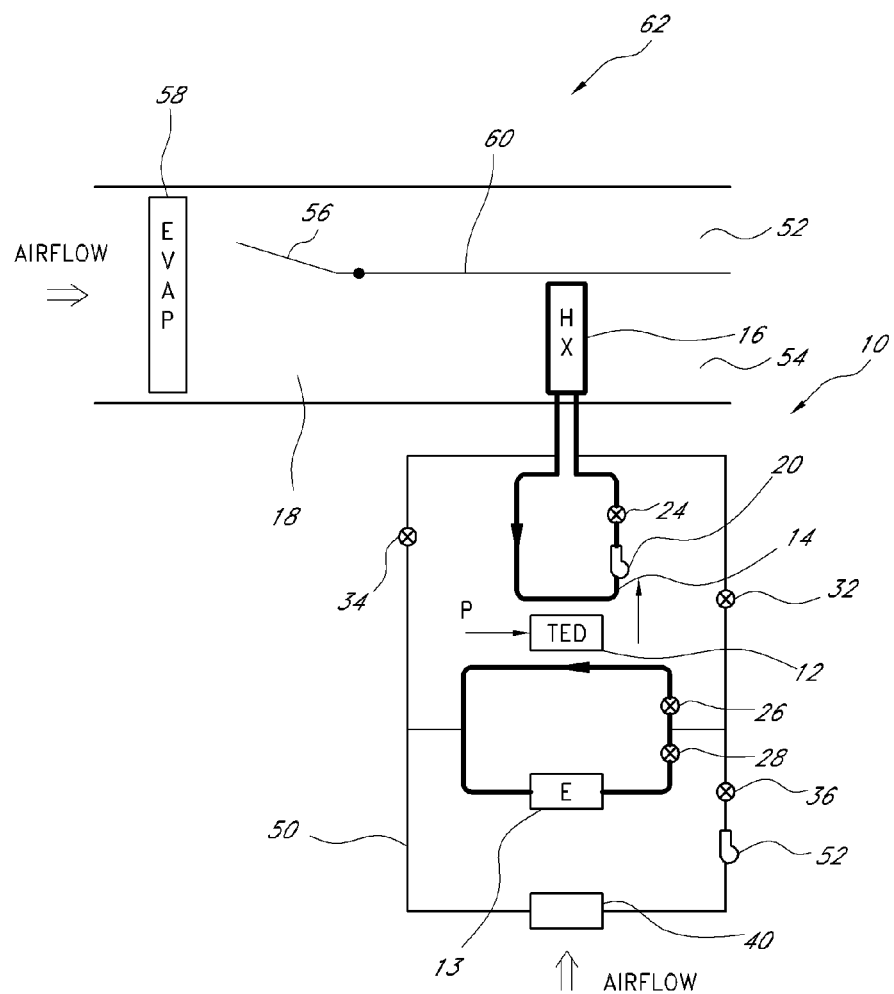
FIG. 5 is a schematic illustration of an embodiment of a temperature control system in a heating mode corresponding to the period during which the engine is warming up.

FIG. 5 illustrates an embodiment of a temperature control system 10 used for providing temperature controlled air to a passenger compartment. In this embodiment, the system 10 comprises a thermoelectric device (TED) 12, an engine 13, a heat transfer device, such as a heat exchanger 16, and a passenger air channel, such as an HVAC system 62. In some embodiments the system additionally comprises a low temperature core 40. The system further comprises one or more pumps 20, 52 and actuators 24, 26, 28, 32, 34, 36 that are configured to transfer fluid, such as coolant, among the different components. The engine 13 can be any type of vehicle engine, such as an internal combustion engine, that is a source of thermal energy. The system 10 can be controlled by a controller, plurality of controllers, or any other device which can function to control the pumps, valves, heat source, TED, and other components of the system. By controlling the components, valves and pumps, the controller can operate the system in various modes of operation. The controller can also change the mode of the system in response to input signals or commands.

In one embodiment, a fluid such as a liquid coolant transfers thermal energy among the system components and is controlled by one or more pumps. The liquid coolant can carry the thermal energy via a system of tubes that provide fluid communication among the various components. The actuators can be used to control which components are in thermal communication with the heat exchanger 16 at a given time. Alternatively, a temperature control system might use other materials or means to provide thermal communication among components.

In this embodiment, the system 10 uses a single heat exchanger 16, which allows for minimal impact on the HVAC design because it can maintain a typical configuration without the need for an additional heat exchangers. However, it is also contemplated that the system 10 could be configured with a plurality of heat exchangers and/or a plurality of HVAC systems or airflow channels. Depending on the mode of the system 10, the heat exchanger 16 may be in thermal communication with the engine 13 or the low temperature core 40. In a heating mode the heat exchanger 16 may be in thermal communication with the engine 13 and/or the thermoelectric device 12. In a cooling mode the heat transfer device 16 may be in thermal communication with the low temperature core or radiator 40 and/or the thermoelectric device 12.

Also illustrated in FIG. 5 is an embodiment of the HVAC system 62 through which an airflow passes before entering the passenger compartment. In this embodiment the heat transfer device 16 is functionally coupled to or disposed within the HVAC system 62 so that it can transfer thermal energy to or from the airflow. The airflow in the HVAC system 62 can flow through one or more channels 52, 54 separated by a partition 60. In certain embodiments, the first and second channels 52, 54 are of the same approximate size (e.g., same approximate height, length, width, and/or cross-sectional area). In other embodiments, the first and second channels 52, 54 are of differing sizes, as illustrated in FIG. 5. For example, the width, height, length, and/or cross-sectional area of the first and second channels 52, 54 can be different. In some embodiments, the first channel is larger than the second channel. In other embodiments, the first channel is smaller than the second channel. In further embodiments, additional partitions may be used to create any number of channels or conduits. The partitions may be of any suitable material, shape, or configuration. The partitions can serve to partially or completely separate the conduits or channels and may have apertures, gaps, valves, blend doors, other suitable structures, or a combination of structures that allow for fluid communication between channels. At least a portion of the partition can thermally insulate the first channel 52 from the second channel 54.

In certain embodiments, the HVAC system 62 comprises a first movable element configured to be operable to control the airflow passing through the first and second channels 52, 54. For example, a blend door 56 can be configured to control the airflow passing through the channels 52, 54. The blend door can be rotatably coupled proximate the entrance of the channels 52, 54. By rotating, the blend door can control the airflow through the channels 52, 54. The blend door 56 can selectively modify, allow, impede, or prevent airflow through one or both of the first and second channels 52, 54. Preferably, the blend door 56 can prevent airflow through one of the channels while directing all of the airflow through the other channel. The blend door 56 can also allow airflow through both channels in varying amounts and ratios. In some embodiments, the blend door 56 is coupled to the partition 60 and rotates relative to the partition 60. It is also contemplated that more than one blend door could be used in the HVAC system 62 in order to direct airflow and improve heating and/or cooling of the airflow.

In some embodiments an evaporator 58 may be disposed in the HVAC system 62 in the path of the airflow in order to remove moisture from the airflow before it enters the passenger compartment. In some embodiments, the evaporator 58 may be positioned before the channels 52, 54 so that it may condition the entire airflow. In other embodiments the evaporator may be positioned within one of the channels so that it may condition only the airflow in a certain channel. Other devices such as condensers can also be used to prepare or cool the airflow before it enters the passenger compartment.

In one embodiment, the system works in different modes including a first mode, or a heating mode for the period while the engine is warming up ("start up heating mode"), a second mode, or a heating mode for when the engine is sufficiently warm ("warm engine heating mode"), and a third mode for cooling the passenger compartment ("cooling mode"). In some embodiments, a single system can perform each of the various modes, but it is also contemplated that embodiments of the invention can be configured to perform only one of the modes described below. For example, one embodiment might be configured to only perform the mode of providing thermal energy from the thermoelectric device while the engine warms. Another embodiment might be configured to only provide cooling as described in the cooling mode.

FIG. 5 illustrates an embodiment of a temperature control system 10 in the first mode, which may also be referred to as the "start up heating mode." In this mode, heat is provided to the passenger compartment while the engine 13 is warming up and has not yet reached a temperature sufficient to heat the passenger compartment. When the engine 13 is first started, it does not generate enough heat to sufficiently increase the temperature within the passenger compartment. A vehicle engine can take several minutes or more to warm up to the necessary temperature to provide comfort air to the passenger compartment. In this mode, a controller provides electrical energy to the TED 12 which generates a thermal gradient and transfers heat from the heating end of the TED 12 to the heat transfer circuit 14. Liquid coolant within the heating circuit 14 is moved through the heating circuit by pump 20. The valve 24 is open and the heating circuit 14 is in fluid communication with the heat exchanger 16, which thermally connects the TED 12 and the heat exchanger 16. The heat exchanger 16 is disposed in the HVAC system 62. In this manner, the thermal energy transferred to the coolant by the thermoelectric device 12 is transferred by the heat exchanger 16 to the airflow entering the passenger compartment. In one embodiment, the TED 12 is the sole source of thermal energy for the heat exchanger 16 and no thermal energy is taken from the engine 13.

In an alternate embodiment, in the start up heating mode, thermal energy from the engine 13 is also used to heat the coolant in the heat transfer circuit 14. Valves 26 and 28 can be opened and a pump within the engine 13 can be configured to circulate the coolant between the engine 13 and the TED 12. The heated coolant from the engine 13 transfers thermal energy to the TED 12. The polarity of the TED 12 is configured to transfer thermal energy from the engine to the heat transfer circuit 14 and the heat exchanger 16. Thus, the heat exchanger 16 is receiving thermal energy from both the engine 13 and the TED 12.

As illustrated in FIG. 5, some valves 32, 34, and 36 can be closed during the start up heating mode. The controller can also disengage the pump 52 that circulates coolant in the circuit connected to the low temperature core 40. In some embodiments, the low temperature core 40 is not needed during the start up heating mode because the airflow into the passenger compartment is being heated.

In this embodiment, the HVAC system 62 can include a blend door 56 or other device that is configured to direct the airflow into different channels 52, 54 leading to the passenger compartment. In this embodiment the heat exchanger 16 is located in the second channel 54 and in the start up heating mode and the blend door 56 is positioned so that at least a portion of the airflow is directed through the second channel 54. In an alternative embodiment, the heat exchanger 16 may be operatively coupled to or placed within more than one channel of the HVAC system 62.

During the start up heating mode, the system 10 can be configured to provide demisting of the airflow before it enters the passenger compartment. The evaporator 58 can be configured within the HVAC system 62 so that the airflow passes through the evaporator 58, thereby cooling and removing moisture from the airflow before it is heated by heat exchanger 16.

Figure 6:
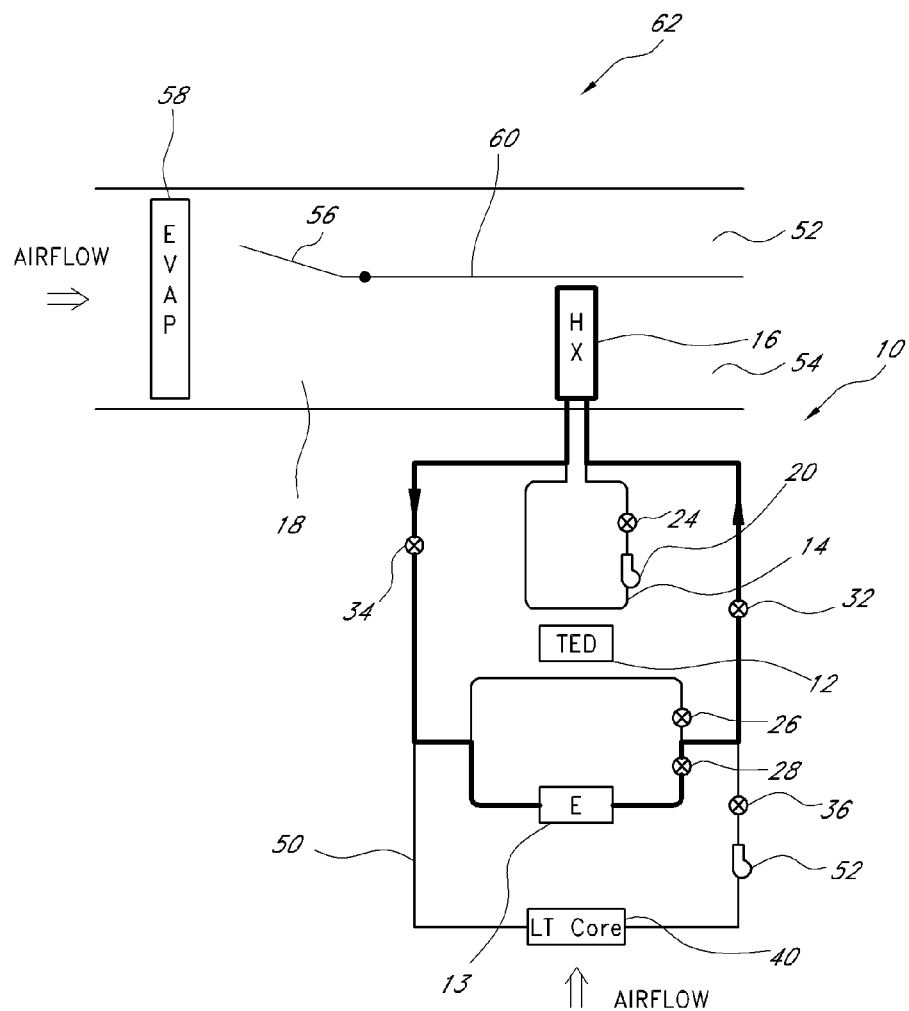
FIG. 6 illustrates schematically an embodiment of a temperature control system in a heating mode when the engine is sufficiently warm.

FIG. 6 illustrates an embodiment of a temperature control system 10 in a second mode, which can also be referred to as the "warm engine heating mode." In this mode, the engine 13 has reached a sufficient temperature and is the sole source of thermal energy for the system. In this mode, the engine 13 is in thermal communication with the heat exchanger 16. Thermal energy from the engine 13 is transferred via coolant through the tubing to the heat exchanger 16. A pump within the engine 13 may be configured to circulate coolant between the engine 13 and the heat exchanger 16. The controller operates to open actuators 24, 32, and 34 in order to allow fluid communication between the heat exchanger 16 and the engine 13. In some embodiments, actuators 24 and 26 may be closed to allow more efficient flow of the coolant, and actuator 36 is closed so that there is no coolant flow to the radiator 40.

In the warm engine heating mode, the controller can stop the electrical energy supplied to the TED 12 and can disengage the pump 20. When the engine 13 is at a sufficient temperature, the TED 12 is no longer needed and the electrical energy applied to the TED 12 can be conserved. By controlling the operation of the actuators, the system 10 is able to bypass the TED 12 and thermally connect the heat exchanger 16 to the engine 13. In this embodiment, it is not necessary to have multiple heat exchangers 16 or multiple sets of heat exchangers in the passenger air channel 62. Instead, the system 10 can operate in various cooling and/or heating modes while being connected to a single heat exchanger 16 or to a single set of heat exchangers.

When the temperature control system is in the warm engine heating mode, an evaporator 56 can be configured to remove moisture from the airflow. Therefore, demisting is possible during the entire heating process. Similar to the configuration of the start up heating mode, the evaporator 56 can be positioned in the HVAC system 62 so that the airflow passes through the evaporator 56 before being heated by the heat exchanger 16.

A blend door 56 can direct at least a portion of the airflow through a channel 54 in which the heat exchanger 16 is located so that the airflow is heated before entering the passenger compartment. To heat the passenger compartment at a slower rate, the blend door 56 can be adjusted to allow less of the airflow to pass through the heat exchanger 16 channel 54 and/or allow more of the airflow to pass through the other channel 52 which is not heated. To increase the heating rate, the blend door can be adjusted so that more of the airflow is directed through the channel 54 with the heat exchanger 16 and less of the airflow is allowed into the other channel 52.

If desired, it is also possible to use the TED 12 as a thermal energy source during the warm engine heating mode. Although a warm engine 13 can typically supply enough thermal energy to the heat exchanger 16 for heating the passenger compartment, a TED 12 can be used as a supplemental thermal energy source. The actuators in the system 10 can be configured such that the engine 13 and the heating circuit 14 are placed in thermal communication with the heat exchanger 16. Electric energy can continue to be supplied to the TED 12 so that it transfers thermal energy to the heating circuit 14 which is moved to the heat exchanger by pump 20. The thermal energy from the TED 12 is supplemental because the engine 13 also transfers thermal energy to the heat exchanger 16 via heated coolant moved by a pump within the engine 13.

Figure 7:
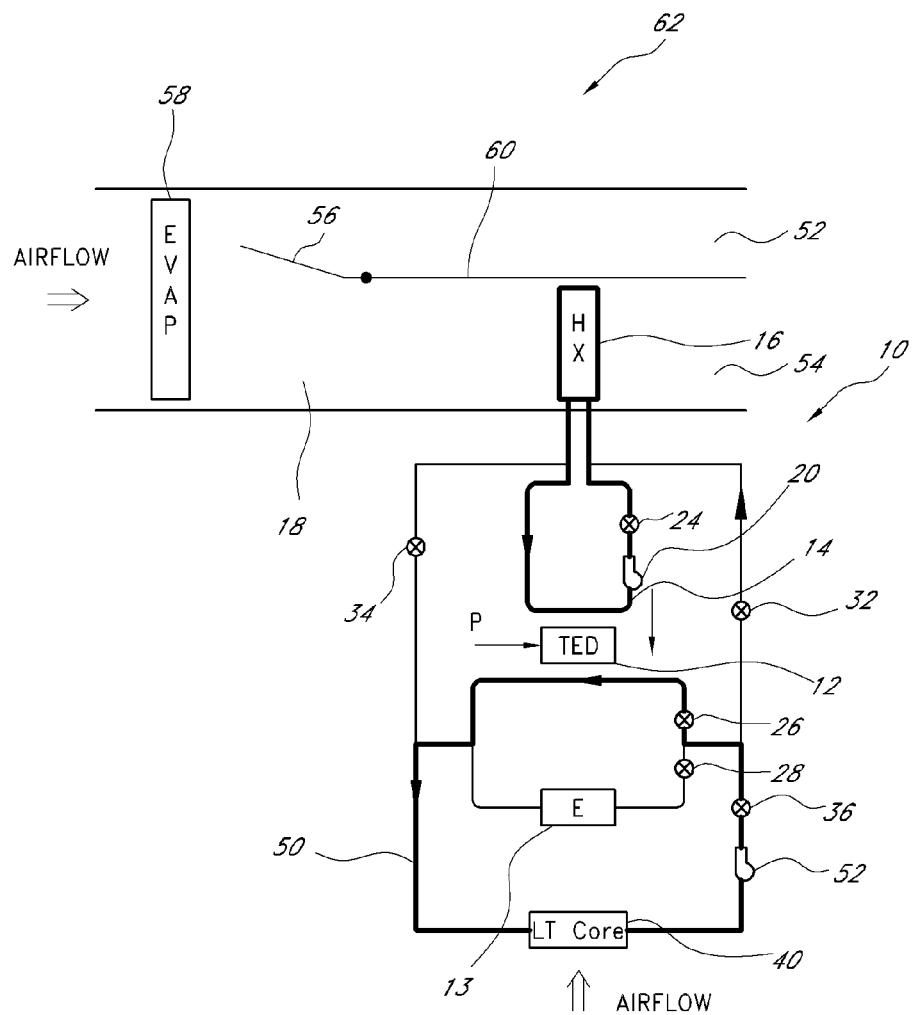
FIG. 7 illustrates schematically an embodiment of a temperature control system in a cooling mode.

FIG. 7 illustrates an embodiment of a temperature control system 10 in a third mode or "cooling mode." In this mode, the system 10 cools the airflow in the HVAC system 62 by transferring heat from the airflow to the heat exchanger 16. In one embodiment, valve 24 is opened and pump 20 engaged to allow coolant flow through the heat transfer circuit 14, transferring thermal energy from the heat exchanger 16 to the TED 12. The TED 12 receives electric energy with a polarity opposite the polarity used in the heating modes. When electrical energy of the opposite polarity is applied to the TED 12, the direction of the thermal gradient is reversed. Instead of providing heat or thermal energy to the heat exchanger 16, the TED 12 cools heat exchanger 16 by transferring thermal energy away from the heat transfer circuit 14.

In another embodiment of the system 10, a low temperature core or radiator 40 is configured to assist in cooling the airflow. As part of the system 10, a heat sink circuit or cooling circuit 50 is configured so that the TED 12 is in thermal communication with the low temperature core or radiator 40. In this embodiment, actuators 28, 32, and 34 are closed, actuators 26 and 36 are open, and pump 52 is engaged so that coolant flows through the low temperature core 40. In this configuration the engine 13 is bypassed by the coolant system and is not in thermal communication with the TED 12 or heat exchanger 16. Thus, the cooling circuit 50 and radiator 40 transfer heat from the TED 12 in an efficient manner.

Preferably, the cooling circuit 50 and/or the radiator 40 are located proximate the thermoelectric device 12 as to provide efficient transfer of thermal energy. The direction of the thermal gradient of the TED 12 during cooling transfers thermal energy from the heat transfer circuit 14 to the cooling circuit 50 and the radiator 40. The heating end of the TED 12 is directed toward the cooling circuit 50 and the cooling end of the TED is directed toward the heating circuit 32. Therefore, heat is transferred from the airflow, through the heat exchanger 16 and heating circuit 14, to the cooling end of the TED 12. From the TED 12, heat is transferred from its heating end to the cooling circuit 50 and into the radiator 40. Preferably, the radiator 40 or low temperature core is exposed to airflow or another source for dissipating heat.

During the "cooling mode," an evaporator 58 may be used as part of cooling the airflow before it enters the passenger compartment. The evaporator 58 can be configured so that the airflow passes through it and moisture is removed before it reaches the heat exchanger 16. Also, the heat exchanger 16 can be located within one of a plurality of channels 52, 54. A blend door 56 can be configured to direct airflow into the channel 54 in which the heat exchanger 16 is located. Similar to the heating modes, in the "cooling mode" the blend door 56 can adjust the rate of cooling by adjusting how much air flow is allowed through the channels 52, 54. Alternatively, the heat exchanger 16 could be configured to transfer heat from the entire airflow without the use of separate channels.

Figure 8:
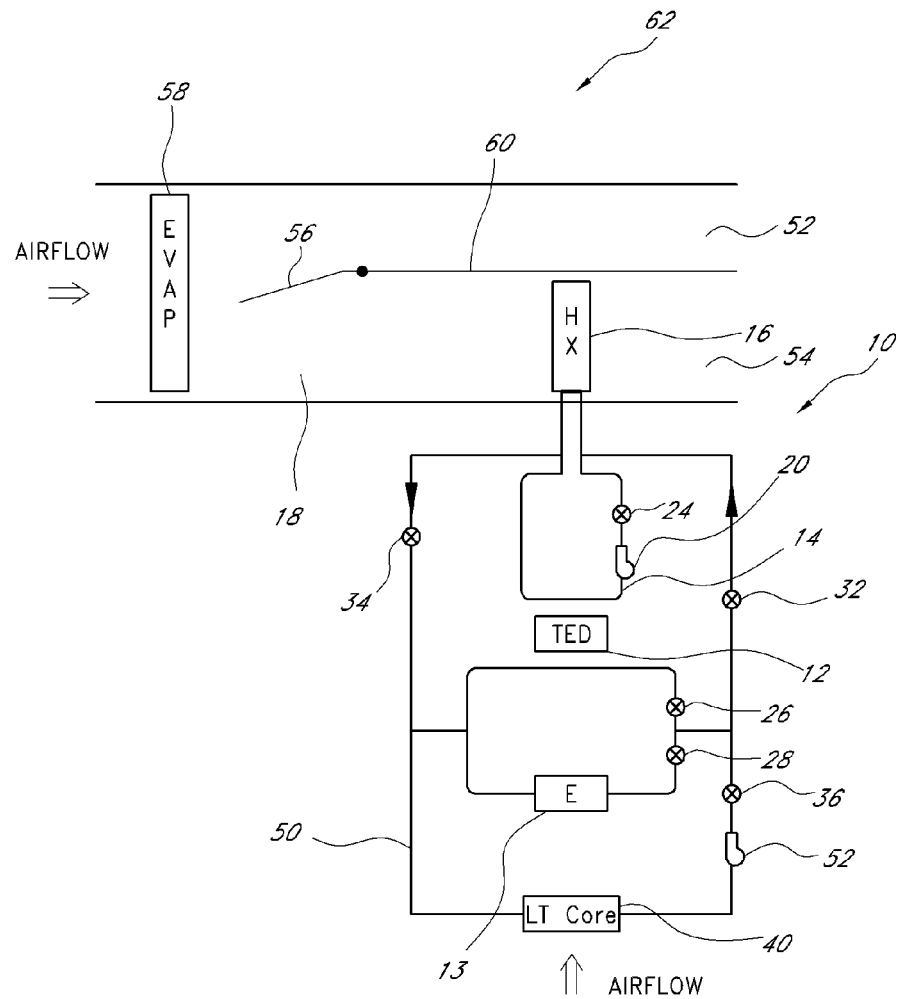
FIG. 8 illustrates an embodiment of a temperature control system in an alternative cooling mode.

FIG. 8 illustrates an alternate embodiment of a temperature control system that can be used to cool the passenger compartment of a vehicle. In this embodiment, the airflow can be cooled without the use of a heat exchanger 16. All of the valves can be closed and all of the pumps turned off. No electrical energy is applied to the TED 12 and there is no thermal energy transfer from the engine 13 to the heat exchanger 16. Instead of using the heat exchanger as a source of heat transfer, the airflow is directed into a channel 52 and then into the passenger compartment. In one embodiment, a blend door 56 is configured to direct substantially all of the airflow into channel 52 so that the airflow does not pass through the heat exchanger 16 before entering the passenger compartment. In some embodiments, airflow may pass through an evaporator 58 before entering into the channel 52. Alternatively, an evaporator 58 may be located within the channel 52 through which the airflow passes. In this manner, the airflow is cooled without system 10 providing any heat transfer to the HVAC system 62.

Reference throughout this specification to "some embodiments," "certain embodiments," or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Although the invention presented herein has been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular embodiments described above, but should be determined only by a fair reading of the claims that follow.

What is claimed is:

1. A system for controlling temperature in a passenger compartment of a vehicle, the system comprising:
   at least one passenger air channel configured to deliver a passenger airflow to the passenger compartment of the vehicle,
   at least one thermal energy source,
   at least one heat transfer device disposed in the passenger air channel, the heat transfer device comprising a fluid conducting tube,
   at least one thermoelectric device,
   a first fluid circuit configured to circulate coolant to the thermal energy source and the thermoelectric device,
   a second fluid circuit separate from the first fluid circuit, the second fluid circuit configured to circulate coolant to the thermoelectric device and the fluid conducting tube of the heat transfer device,
   a third fluid circuit configured to circulate coolant to the thermoelectric device and to at least one low temperature core, the third fluid circuit configured to bypass the thermal energy source and the low temperature core configured to dissipate thermal energy to ambient air, at least one bypass circuit configured to connect the thermal energy source to the fluid conducting tube of the heat transfer device, at least one actuator configured to cause coolant to circulate in the bypass circuit instead of the first fluid circuit and the second fluid circuit, and at least one control system configured to operate the at least one actuator in a first mode while the thermal energy source is warming up and a second mode when the thermal energy source is ready to provide heat to the passenger airflow, thereby causing coolant to circulate in the bypass circuit instead of in the first fluid circuit and the second fluid circuit, wherein, when the control system operates in the first mode, coolant is circulated through the second fluid circuit and the fluid conducting tube of the heat transfer device, and wherein, when the control system operates in the second mode, coolant is circulated through the bypass circuit and the fluid conducting tube of the heat transfer device.

2. The system of claim 1, wherein the second fluid circuit comprises at least one pump configured to circulate coolant in the second fluid circuit.

3. The system of claim 1, further comprising at least one evaporator operatively connected to the passenger air channel.

4. The system of claim 1, further comprising at least one blend door operatively connected in the passenger air channel and configured to route the passenger airflow across the heat transfer device.

5. The system of claim 4, wherein the at least one passenger air channel comprises a first air channel and a second air channel in at least partial parallel arrangement with respect to the first air channel, wherein the at least one blend door is configured to selectively divert the passenger airflow such that the passenger airflow flows through the first air channel, through the second air channel, or through both the first air channel and the second air channel.

6. The system of claim 1, wherein the at least one thermal energy source comprises a vehicle engine.

7. The system of claim 1, wherein the at least one low temperature core comprises a radiator configured to dissipate heat.

8. The system of claim 1, wherein the third fluid circuit comprises at least one pump to circulate fluid in the third fluid circuit.

9. The system of claim 1, wherein the at least one control system is further configured to:
determine whether the system is operating in a heating mode or a cooling mode; and
operate the at least one actuator to cause coolant to circulate in the third fluid circuit when the system is operating in the cooling mode.

10. The system of claim 9, wherein the system operating in the heating mode comprises the control system operating in the first mode and the second mode, and wherein when the system operates in the cooling mode, coolant is circulated through the second fluid circuit and the fluid conducting tube of the heat transfer device.

11. The system of claim 10, wherein the control system is further configured to:
determine when the system is operating in a demisting mode; and
operate the at least one actuator to cause coolant to circulate in the second fluid circuit or the bypass circuit when the system is operating in the demisting mode; and wherein when the system operates in the demisting mode, coolant is circulated through the second fluid circuit or the bypass circuit and through the fluid conducting tube of the heat transfer device.

12. The system of claim 9, further comprising:
a first tubing portion connected to the first fluid circuit, the bypass circuit, and the third fluid circuit, the first tubing portion configured to convey coolant therethrough; and
a second tubing portion connected to the first fluid circuit, the bypass circuit, and the third fluid circuit, the second tubing portion configured to convey coolant therethrough and downstream from the first tubing portion with respect to a direction of coolant flow through the first and third fluid circuits and the bypass circuit;
wherein when the control system operates in the first mode, coolant is circulated through the first fluid circuit, the first tubing portion, and the second tubing portion;
wherein when the control system operates in the second mode, coolant is circulated through the bypass circuit, the first tubing portion, and the second tubing portion; and
wherein when the system is operating in the cooling mode, coolant is circulated through the third fluid circuit, the first tubing portion, and the second tubing portion.

13. The system of claim 12, further comprising:
a third tubing portion connected to the second fluid circuit and the bypass circuit, the third tubing portion configured to convey coolant therethrough; and
a fourth tubing portion connected to the second fluid circuit and the bypass circuit, the fourth tubing portion configured to convey coolant therethrough, and the fourth tubing portion downstream from the third tubing portion with respect to the direction of coolant flow through the bypass circuit and downstream from the third tubing portion with respect to a direction of coolant flow through the second fluid circuit;
wherein when the control system operates in the first mode, coolant is circulated through the second fluid circuit, the third tubing portion, and the fourth tubing portion;
wherein when the control system operates in the second mode, coolant is circulated through the bypass circuit, the third tubing portion, and the fourth tubing portion; and
wherein when the system is operating in the cooling mode, coolant is circulated through the second fluid circuit, the third tubing portion, and the fourth tubing portion.

14. The system of claim 1, wherein the at least one thermal energy source is ready to provide heat to the passenger airflow when the thermal energy source reaches a threshold temperature.

15. The system of claim 1, wherein the at least one thermal energy source is ready to provide heat to the passenger airflow when the coolant circulating through the at least one thermal energy source reaches a threshold temperature.

16. The system of claim 1, wherein the at least one actuator comprises a fluid control device, a valve, a regulator, or a combination of structures.

17. The system of claim 1, further comprising:
at least one evaporator operatively connected to the passenger air channel; and
at least one blend door operatively connected in the passenger air channel and configured to route the passenger airflow across the heat transfer device, the at least one blend door downstream of the at least one evaporator with respect to a flow direction of the passenger airflow when the passenger airflow is being delivered to the passenger compartment of the vehicle;

wherein the at least one passenger air channel comprises a first air channel and a second air channel in at least partial parallel arrangement with respect to the first air channel, wherein the at least one blend door is configured to selectively divert the passenger airflow such that the passenger airflow flows through the first air channel, through the second air channel, or through both the first air channel and the second air channel;

wherein the heat transfer device is operatively connected to the second air channel; and wherein when the at least one blend door diverts the passenger airflow through the second air channel or through both the first air channel and the second air channel, the heat transfer device is directly downstream of the evaporator with respect to the flow direction of the passenger airflow.

* * * * *

UNITED STATES PATENT AND TRADEMARK OFFICE
CERTIFICATE OF CORRECTION

| | | |
|---|---|---|
| PATENT NO. | : 9,038,400 B2 | |
| APPLICATION NO. | : 12/782569 | |
| DATED | : May 26, 2015 | |
| INVENTOR(S) | : Goenka | |

It is certified that error appears in the above-identified patent and that said Letters Patent is hereby corrected as shown below:

On the title page

Column 2 page 3, item 56 line 9, change "Bell" to --Bell et al.--.

In the claims

Column 14 line 66 Claim 1, change "source" to --source,--.

Signed and Sealed this
Ninth Day of February, 2016

Michelle K. Lee
*Director of the United States Patent and Trademark Office*